US011437167B2

(12) United States Patent
Tachibana et al.

(10) Patent No.: US 11,437,167 B2
(45) Date of Patent: Sep. 6, 2022

(54) INSULATED WIRE

(71) Applicant: ESSEX FURUKAWA MAGNET WIRE JAPAN CO., LTD., Tokyo (JP)

(72) Inventors: Akira Tachibana, Tokyo (JP); Shoichi Danjo, Tokyo (JP)

(73) Assignee: ESSEX FURUKAWA MAGNET WIRE JAPAN CO., LTD., Tokyo (JP)

( * ) Notice: Subject to any disclaimer, the term of this patent is extended or adjusted under 35 U.S.C. 154(b) by 295 days.

(21) Appl. No.: 16/909,861

(22) Filed: Jun. 23, 2020

(65) Prior Publication Data

US 2020/0328009 A1 Oct. 15, 2020

Related U.S. Application Data

(63) Continuation of application No. PCT/JP2019/000090, filed on Jan. 7, 2019.

(30) Foreign Application Priority Data

Jan. 10, 2018 (JP) ............................ JP2018-001677

(51) Int. Cl.
*H01B 7/02* (2006.01)
*H01B 7/29* (2006.01)
(Continued)

(52) U.S. Cl.
CPC ............. *H01B 7/292* (2013.01); *H01B 1/026* (2013.01); *H01B 3/305* (2013.01); *H01B 3/306* (2013.01); *H01B 3/36* (2013.01)

(58) Field of Classification Search
CPC .......... H01B 1/026; H01B 3/02; H01B 3/305; H01B 3/306; H01B 3/36; H01B 7/02; H01B 7/04; H01B 7/292
(Continued)

(56) References Cited

U.S. PATENT DOCUMENTS

2009/0084473 A1 4/2009 Aruga et al.
2015/0021067 A1 1/2015 Muto et al.

FOREIGN PATENT DOCUMENTS

CN 104099491 A * 10/2014 ................ C22F 1/08
CN 105518165 A * 4/2016 ............... C22C 9/02
(Continued)

OTHER PUBLICATIONS

International Search Report for PCT/JP2019/000090 (PCT/ISA/210) dated Mar. 12, 2019.
Taiwanese Office Action issued in TW Application No. 108100811 dated Oct. 21, 2019.
(Continued)

*Primary Examiner* — William H. Mayo, III
(74) *Attorney, Agent, or Firm* — Birch, Stewart, Kolasch & Birch, LLP

(57) ABSTRACT

An insulated wire includes: a copper alloy conductor; and at least one resin layer directly or indirectly coated on an outer peripheral face of the copper alloy conductor, in which the copper alloy conductor has a composition where a total content of metal components selected from Al, Be, Cd, Mg, Pb, Ni, P, Sn, and Cr is from 0.1 to 2.0 ppm and content of copper is 99.96 mass % or higher, and has a specific texture where an average orientation density in an area where φ2=0 degrees, φ1=0 degrees, and Φ=from 0 degrees to 90 degrees is from 3.0 to less than 35.0, and a maximum orientation density in an area where φ2=35 degrees, φ1=from 45 degrees to 55 degrees, and Φ=from 65 degrees to 80 degrees is from 1.0 to less than 30.0.

7 Claims, 2 Drawing Sheets

(51) Int. Cl.
*H01B 1/02* (2006.01)
*H01B 3/30* (2006.01)
*H01B 3/36* (2006.01)

(58) Field of Classification Search
USPC ............... 174/110 R–110 PM, 117 R–117 FF
See application file for complete search history.

(56) References Cited

FOREIGN PATENT DOCUMENTS

| | | | | |
|---|---|---|---|---|
| CN | 106164306 | A | * 11/2016 | ............ H01B 1/026 |
| EP | 0 296 596 | A1 | 12/1988 | |
| EP | 3 128 036 | A1 | 2/2017 | |
| JP | 5-258618 | A | 10/1993 | |
| JP | 2014-154262 | A | 8/2014 | |
| SU | 569650 | A1 | 8/1977 | |
| TW | 200706660 | A | 2/2007 | |
| TW | 201704489 | A | 2/2017 | |
| WO | WO 2012/072109 | A1 | 6/2012 | |
| WO | WO 2016/171054 | A1 | 10/2016 | |
| WO | WO 2018/181593 | A1 | 10/2018 | |

OTHER PUBLICATIONS

Written Opinion of the International Searching Authority for PCT/JP2019/000090 (PCT/ISA/237) dated Mar. 12, 2019.

Extended European Search Report for European Application No. 19738956.2, dated Sep. 22, 2021.

Ivanov et al., "Effect of degree of cold work and annealing temperature on the microstructure and properties of cold drawn copper wires and tubes," Bulletin of Materials Science, vol. 19, No. 1, Feb. 1996, pp. 131-138.

Jakani et al., "Effect of impurities on the recrystallization texture in commercially pure copper-ETP wires," Materials Science and Engineering A, vol. 456, No. 1-2, 2007, pp. 261-269.

Suresh et al., "Development of microstructure and texture in Copper during warm accumulative roll bonding," Materials Characterization, vol. 70, Apr. 27, 2012, pp. 74-82.

* cited by examiner

INSULATED WIRE

CROSS-REFERENCE TO RELATED APPLICATIONS

This application is a Continuation of PCT International Application No. PCT/JP2019/000090 filed on Jan. 7, 2019, which claims priority under 35 U.S.C. § 119 (a) to Japanese Patent Application No. 2018-001677 filed in Japan on Jan. 10, 2018. Each of the above applications is hereby expressly incorporated by reference, in its entirety, into the present application.

TECHNICAL FIELD

The present invention relates to an insulated wire, and particularly relates to an insulated wire which is used as a coil of an electric generator installed, for example, in vehicles that are driven with electric power.

BACKGROUND ART

Hitherto, in coils for electrical or electronic equipment including inverter-related equipment, such as high-speed switching devices, inverter motors, transformers, and the like, there are used, as a magnet wire, insulated electric wires (insulated wires) composed of a so-called enamel wire, insulated wires having multi-covering layers including an enamel insulating layer composed of an enamel resin and a covering layer composed of another kind of resin other than the enamel resin, and the like. As the insulated wire having multiple covering layers, Patent Literature 1, for example, discloses an insulated wire having, on a conductor, a layer produced by extruding a polyetheretherketone resin, a polyimide resin, or the like, and a thermosetting polyamideimide resin layer, as covering layers.

On the other hand, in recent years, advance of the electrical equipment represented by motors or transformers, has been progressed resulting in improved performance. Thus, it becomes usual in many cases that insulated wires are used in such a way that the insulated wires are processed by winding (coil processing) and they are pushed into a quite small space to pack. Specifically, for an enhancement of the performance of a rotating machine, such as a motor, it is required that a larger number of wound wires are accommodated into the slots of a stator. That is, improvement of the ratio of the sectional area of conductors to the sectional area of the stator slot (space factor) has been required to be particularly highly increased.

As a means of improving the space factor, a rectangular conductor whose cross-section of the conductor is an approximate rectangular shape has been adopted. In a case of producing a small coil by using a rectangular conductor, in order to improve the space factor, the small coil is produced by an edge-wise-winding processing of an insulated wire having a small radius of curvature at a corner of the conductor, around a small diameter of a core. Use of a rectangular conductor exhibits a dramatic effect in increasing the space factor. However, on the other hand, a corner portion of cross-section rectangular is extremely brittle to bending processing such as coil processing. Due to this, there is a problem that a coated layer cracks when the rectangular wire is processed by applying strong pressure. Furthermore, when the distance between conductors cannot be secured by making the thickness of the insulating coated layer of the wound wire smaller, and the insulation performance cannot be secured. Furthermore, when the insulating coated layer of the wound wire is damaged, discharge occurs from the exposed conductor of the wound wire.

In order to improve these electrical characteristics and mechanical characteristics of the insulated wire, various investigations have been conducted. For example, from a relationship involving the relative permittivities of the enamel insulating layer and an extruded insulating layer and the temperature dependency of the tensile strength of the extruded insulating layer, it has been suggested that the thickness of the insulating coated layer is made thick without impairing the insulation performance at high temperature, thereby the partial discharge inception voltage is made higher, and the thermal-aging characteristics are improved (see Patent Literature 2).

CITATION LIST

Patent Literatures

Patent Literature 1: JP-A-5-258618 ("JP-A" means unexamined published Japanese patent application)

Patent Literature 2: JP-A-2014-154262

Meanwhile, it has recently been in rapid progress to develop HV vehicles (hybrid cars) using a rotary electric machine as a driving motor and/or EV vehicles (electric cars) using electric power, generated by coils of an electric generator (a motor generator), for driving. In such vehicles, the standard required for making, in particular, electric equipment smaller or output more power becomes increasingly higher.

The space factor for a stator in the case of a rectangular conductor can be larger than in the case of a conductor with an approximately circular cross-section. Thus, the electric equipment can be realized to be made smaller and to output more power. However, in the miniaturized electric equipment, its working voltage is set to be high because the machine is made highly efficient and as a result of which the amount of heat generated also increases. Even after an insulated wire is exposed to an instantaneous or intermittent high temperature, for example, a high temperature exceeding the level designed for the insulated wire, heat resistance is required for exerting sufficient performance. Hence, it is important for an insulated wire to have further enhancement of heat resistance, as an electric generator is made smaller and to output higher power as described above.

SUMMARY OF INVENTION

Technical Problem

The present invention is contemplated for providing an insulated wire which has both favorable electrical conductivity and excellent heat resistance.

Solution to Problem

The inventors of the present invention have conducted intensive research on the above problems and have obtained the finding that use of high-purity oxygen-free copper (OFC), which has a specific composition and texture, as a material for a conductor, makes it possible to suppress the secondary recrystallization (abnormal grain growth) of crystal grains (grains) in the conductor even in a high-temperature range, thereby capable of lowering a change in the grains while the conductor is exposed to a high temperature. This can enhance heat resistance of the whole insulated wire, and, as a result, an insulated wire can be obtained, which has both favorable electrical conductivity and excellent heat resistance.

Specifically, the configuration of the present invention is summarized as follows.

[1] An insulated wire including:

a copper alloy conductor; and at least one resin layer directly or indirectly coated on an outer peripheral face of the copper alloy conductor, wherein the copper alloy conductor has a composition where a total content of metal components selected from Al, Be, Cd, Mg, Pb, Ni, P, Sn, and Cr is from 0.1 to 2.0 ppm and content of copper is 99.96 mass % or higher, and has a texture where when a crystal orientation distribution function obtained from texture analysis by EBSD is expressed using Euler angles (φ1, Φ, and φ2), an average orientation density in an area where φ2=0 degrees, φ1=0 degrees, and Φ=from 0 degrees to 90 degrees is from 3.0 to less than 35.0, and a maximum orientation density in an area where φ2=35 degrees, φ1=from 45 degrees to 55 degrees, and Φ=from 65 degrees to 80 degrees is from 1.0 to less than 30.0.

[2] The insulated wire described in the above item [1], wherein the average grain size of the copper alloy conductor is 1 μm to 100 μm.

[3] The insulated wire described in the above item [1] or [2], wherein the at least one resin layer includes a foamed insulating layer containing a foamed thermosetting resin.

[4] The insulated wire described in the above item [3], wherein an outer insulating layer containing a thermoplastic resin is further formed, on the outer peripheral face of the foamed insulating layer.

[5] The insulated wire described in the above item [3] or [4], wherein the thermosetting resin is selected from the group consisting of polyamideimide (PAI), polyimide (PI), polyamide (PA), polyetherimide (PEI), polyesterimide (PEsI), and polyethersulfone (PES).

[6] The insulated wire described in the above item [1] or [2], wherein the at least one resin layer includes: at least one enamel insulating layer; and an extruded insulating layer that is coated on the outer peripheral face of the enamel insulating layer and that contains a thermoplastic resin.

[7] The insulated wire described in the above item [4] or [6], wherein the thermoplastic resin is selected from the group consisting of polyetheretherketone (PEEK), a modified polyetheretherketone, polyetherketoneketone, polyetherketone, polyetherketoneetherketoneketone, polyphenylene sulfide (PPS), and a thermoplastic polyimide (TPI).

Effects of Invention

According to the present invention, it becomes possible to enhance heat resistance of the whole insulated wire, by using, as a material for the copper alloy conductor, OFC which has a specific composition and texture. This can provide the insulated wire which has both favorable electrical conductivity and excellent heat resistance, and which can contribute to eliciting higher performance of coils of an electric generator carried on, such as each EV vehicle that requires miniaturization and higher output power.

BRIEF DESCRIPTION OF THE DRAWINGS

FIG. 1(A) is a cross-sectional view where φ2=0 degrees and FIG. 1(B) is a cross-sectional view where φ2=35 degrees.

MODE FOR CARRYING OUT THE INVENTION

Figure 1A:
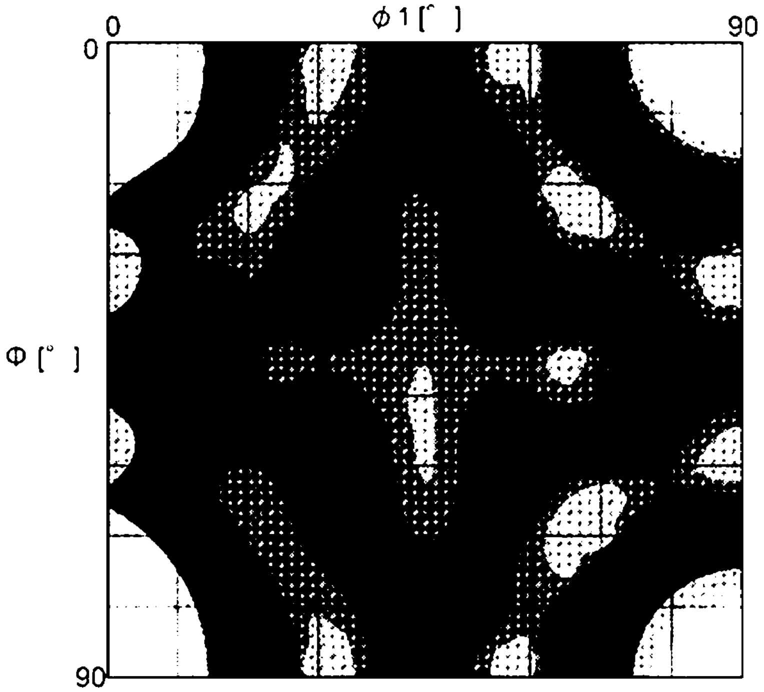
FIG. 1(A) and FIG. 1(B) each are maps illustrating the results of analyzing, by EBSD, a texture of a copper alloy conductor that is used in the present invention.

Hereinafter, embodiments of the insulated conductor according to the present invention will be described in detail with reference to the drawings.

[Insulated Wire]

The insulated wire according to the present invention includes: a copper alloy conductor; and at least one resin layer directly or indirectly coated on an outer peripheral face of the copper alloy conductor. Further, the copper alloy conductor has a composition where a total content of metal components selected from Al, Be, Cd, Mg, Pb, Ni, P, Sn, and Cr is from 0.1 to 2.0 ppm and content of copper is 99.96 mass % or higher, and has a texture where when a crystal orientation distribution function obtained from texture analysis by EBSD is expressed using Euler angles (φ1, Φ, and φ2), an average orientation density in an area where φ2=0 degrees, φ1=0 degrees, and Φ=from 0 degrees to 90 degrees is from 3.0 to less than 35.0, and a maximum orientation density in an area where φ2=35 degrees, φ1=from 45 degrees to 55 degrees, and Φ=from 65 degrees to 80 degrees is from 1.0 to less than 30.0. An insulated wire according to the present invention may use, as a material for the copper alloy conductor, OFC having a specific composition and texture. In this case, even at a temperature of, for example, 700° C. or higher, the secondary recrystallization (abnormal grain growth) of grains in the copper alloy conductor is suppressed, so that it is possible to decrease a change in the grains even when the copper alloy conductor is exposed to a high temperature. This results in enhancement in heat resistance of the whole insulated wire, and the insulated wire can be produced, which exhibits both favorable electrical conductivity and excellent heat resistance.

[Copper Alloy Conductor]

In the present invention, a copper alloy conductor is used. It is preferable to use a copper alloy conductor in which a cross-section shape in a short direction is, for example, approximately rectangular, trapezoidal, or polygonal. It is more preferable to use a rectangular conductor. Use of a conductor having such a shape makes it possible to make the space factor with respect to each slot of a stator core at the time of wire winding higher than use of a conductor having a circular cross-section shape. The size of the conductor is determined according to its intended use and therefore is not limited in particular. However, in a case of using the rectangular conductor, with respective to the length of one side, for example, the width (long side) is preferably from 1.0 mm to 5.0 mm and more preferably from 1.4 mm to 2.7 mm, and the thickness (short side) is preferably from 0.4 mm to 3.0 mm and more preferably from 0.5 mm to 2.5 mm. However, the range of the conductor size by which the effect of the present invention is achieved is not limited to the above. Further, although the cross-sectional shape of the rectangular conductor is also varies according to its intended use, a rectangular cross-section is more common than a square cross-section. Further, in the case of using the rectangular conductor, with respect to the chamfer (curvature radius r) of the 4 corners in the cross-section of the conductor, from the viewpoint of enhancing a conductor space factor in the stator slot, the curvature radius r is preferred with decreasing radius, whereas, from the viewpoint of suppressing a partial discharge phenomenon due to electric field concentration to 4 corners, the curvature radius r is preferred with increasing radius. Therefore, by taking consideration into account the balance of those, the curvature radius r is preferably 0.6 mm or less, and more preferably from 0.2 mm to 0.4 mm. However, the range of the curvature radius r by which the effect of the present invention is achieved is not limited to the above.

In addition, the copper alloy conductor in the present invention may be a segmented conductor that has been divided into multiple segments. When the conductor has multiple segments, it is possible to suppress an impact of current decreased due to the skin effect. This can further improve conductor characteristics, such as electrical conductivity, even when a very thin wire, such as a thin line or a ultra-thin line, is used more frequently as electric equipment that is made smaller.

<Composition of Copper Alloy Conductor>

In the present invention, OFC having a specific composition is used as a material for the copper alloy conductor. In general, OFC means a low-oxygen copper whose oxygen content is 30 ppm or less, and further more preferably a low-oxygen copper whose oxygen content is 20 ppm or less or oxygen-free copper. In a case where the copper alloy conductor is melted by heat for the purpose of welding if the oxygen content is 30 ppm or less, voids caused by contained oxygen are not occurred at a welded portion, the deterioration of the electrical resistance of the welded portion can be prevented, and the mechanical strength of the welded portion can be secured. Further, the content of copper contained in the copper alloy conductor that is used in the present invention is 99.96 mass % or more, and preferably 99.99 mass % or more. When the content of copper is less than 99.96 mass %, the thermal conductivity lowers and desired heat dissipation (heat resistance) cannot be achieved. Meanwhile, in a copper alloy that is used in the present invention, the total content of metal components selected from Al, Be, Cd, Mg, Pb, Ni, P, Sn, and Cr is from 0.1 to 2.0 ppm. A lower limit of the total content of these metal components, in particular, is not necessarily limited and is set to 0.1 ppm after unavoidable impurities are considered. On the other hand, when the total content of these metal components exceeds 2.0 ppm, a desired orientation density cannot be obtained. The copper alloy conductor in the present invention may contain copper and, as the remainder, unavoidable impurities in addition to metal components selected from Al, Be, Cd, Mg, Pb, Ni, P, Sn, and Cr. The unavoidable impurities mean impurities at a content level included unavoidably in production steps.

GDMS can be used for quantifying the above metal components other than copper. Glow Discharge Mass Spectrometry is in short referred to as GDMS and is a technique in which a solid sample is used as a cathode and glow discharge is used to sputter a sample surface; released neutral particles are made to collide with Ar and electrons in plasma and are thus ionized; and the number of ions is measured with a mass spectrometer, to analyze the percentages of trace elements included in a metal.

<Texture>

A copper alloy conductor used in the present invention is configured such that when a crystal orientation distribution function (ODF) obtained from texture analysis by EBSD is expressed using Euler angles (φ1, Φ, and φ2), the average orientation density in an area where φ2=0 degrees, φ1=0 degrees, and Φ=from 0 degrees to 90 degrees is from 3.0 to less than 35.0 and the maximum orientation density in an area where φ2=35 degrees, φ1=from 45 degrees to 55 degrees, and Φ=from 65 degrees to 80 degrees is from 1.0 to less than 30.0. When the rolling direction is set to an RD direction, the transverse direction (a direction perpendicular to the RD direction) of a copper alloy conductor is set to a TD direction, and a direction normal to the rolling face (RD face) is set to an ND direction, a rotation with respect to an axis in the RD direction is expressed as Φ, a rotation with respect to an axis in the ND direction is expressed as φ1, and a rotation with respect to an axis in the TD direction is expressed as φ2. The orientation density is a parameter used when the abundance ratio and the dispersion state of crystal orientations in a texture are quantified, and is calculated by crystal orientation distribution analysis using series expansion based on measured data about three or more different pole figures regarding, for example, (100), (110), (112) planes after EBSD and X-ray diffraction have been conducted. In a cross-sectional view where φ2, which is obtained from texture analysis by EBSD, is fixed at a given angle, the orientation density distribution in the RD plane is displayed.

Figure 1B:
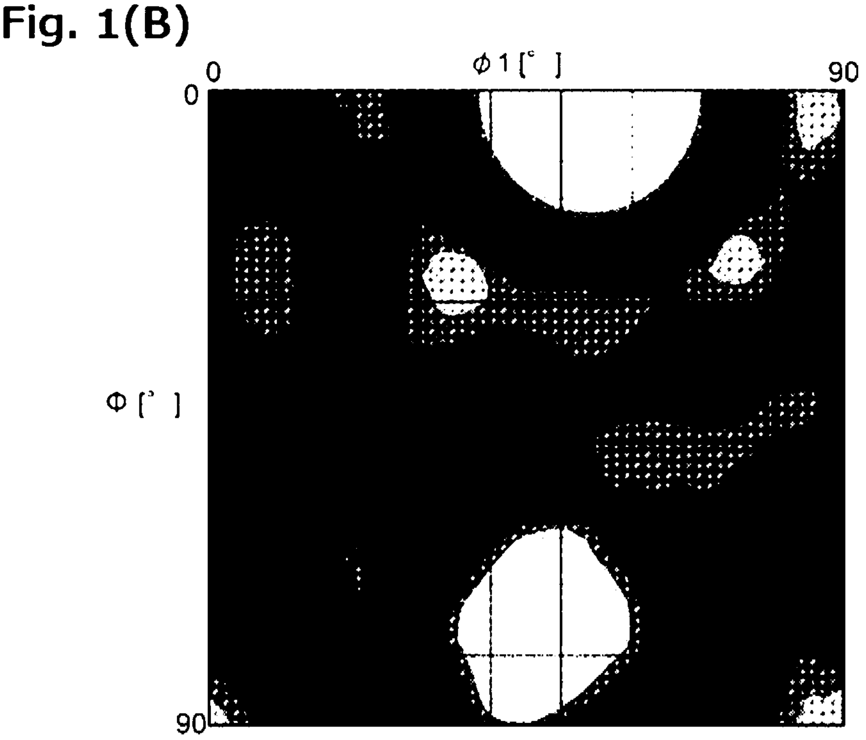

FIGS. 1(A) and 1(B) are maps illustrating the results of analyzing, by EBSD, a texture of a copper alloy conductor in the present invention. FIG. 1(A) is a cross-sectional view where φ2=0 degrees and FIG. 1(B) is a cross-sectional view where φ2=35 degrees. When the crystal orientation distribution is in a random state, the orientation density is defined as 1. Then, how many folds the density accumulates is contoured. In FIGS. 1(A) and 1(B), each white spot indicates a high orientation density and each black spot indicates a low orientation density. As the color of a gray spot becomes closer to white, the orientation density is indicated to be higher.

In the present invention, the average orientation density in an area where φ2=0 degrees, φ1=0 degrees, and Φ=from 0 degrees to 90 degrees is from 3.0 to less than 35.0 and the maximum orientation density in an area where φ2=35 degrees, φ1 from 45 degrees to 55 degrees, and Φ=from 65 degrees to 80 degrees is from 1.0 to less than 30.0. This can suppress growth of grains even at a high temperature of 700° C. or higher. When the average orientation density in an area where Φ=0 degrees is less than 3.0, the characteristic of suppressing secondary recrystallization of grains is poor even if a copper alloy conductor is exposed to a high temperature (e.g., a high temperature of 700° or higher). As a result, the grains markedly grow to a grain size of 300 μm or larger and an insulated wire cannot be given desired heat resistance. On the other hand, when the average orientation density in an area where 0=0 degrees is 35.0 or more, a copper alloy conductor has a lowered tensile strength and is thus easily deformed. Further, even when the maximum orientation density in an area where φ2=35 degrees, φ1=from 45 degrees to 55 degrees, and Φ=from 65 degrees to 80 degrees is 30.0 or more, the characteristic of suppressing secondary recrystallization of grains is poor if a copper alloy conductor is exposed to a high temperature (e.g., a high temperature of 700° or higher). As a result, the grains markedly grow to a grain size of 300 μm or larger and an insulated wire cannot be given desired heat resistance. Note that the orientation density in an area where φ2=0 degrees, φ1=0 degrees, and Φ=from 0 degrees to 90 degrees is generally high and the orientation density in an area where φ2=35 degrees, φ1=from 45 degrees to 55 degrees, and Φ=from 65 degrees to 80 degrees is locally high. Accordingly, the former has been defined using the average and the latter has been defined using the maximum.

The EBSD method, which stands for Electron Back Scatter Diffraction, is a technique of crystal orientation analysis using reflected electron that occurs when a sample is irradiated with an electron beam under a scanning electron microscope (SEM). The measurement area and the scan step at the time of EBSD analysis may be determined depending on the size of grains in a sample. For analysis of the grains after measurement, for example, an analysis software OIM Analysis (trade name) manufactured by TSL can be used. Information obtained by analysis of the grains by the EBSD, includes information on a portion up to a depth of several 10 nm in which an electron beam enters the sample. It is preferable that the site of measurement in the thickness direction of a copper alloy conductor is from a sample surface to a depth about ⅛ to ½ times the thickness of the copper alloy conductor.

<Average Grain Size>

The average grain size of the copper alloy conductor to be used in the present invention is preferably 1 μm to 100 μm. When the average grain size is less than 1 μm, the crystal orientation is not necessarily fully controlled. On the other hand, when the average grain size exceeds 100 μm, a sufficient tensile strength is not necessarily obtained and as a result of which external load stress may cause deformation, detachment, and so on. Note that the grain size can be measured by EBSD analysis of the RD plane in the copper alloy conductor.

<Characteristic>

The copper alloy conductor to be used in the present invention preferably has a tensile strength of 150 to 330 MPa. If the tensile strength is less than 150 MPa, the strength is insufficient, and if the tensile strength exceeds 330 MPa, processability tends to deteriorate.

The copper alloy conductor to be used in the present invention has an electrical conductivity of preferably 95% IACS or more. When the electrical conductivity is less than 95%, the thermal conductivity decreases. This results in a tendency that favorable electrical properties cannot be obtained as well as heat dissipation becomes poor <Method of Preparing Copper Alloy Conductor>

Then, an example of the method of preparing the copper alloy conductor for use in the present invention will be described.

In a method of preparing a copper alloy conductor according to the present invention, a process including a dissolving/casting step [Step 1], a homogenization heat treatment step [Step 2], a hot-rolling step [Step 3], a cooling step [Step 4], a surface grinding step [Step 5], a first cold-rolling step [Step 6], a first annealing step [Step 7], a second cold-rolling step [Step 8], a second annealing step [Step 9], a finishing rolling step [Step 10], a final annealing step [Step 11], a surface oxide layer-removing step [Step 12] is carried out in sequence to produce a copper sheet with a desired thickness. Then, a shaping step [Step 13] of processing the resulting copper sheet into a copper alloy conductor (e.g., a rectangular wire shape) having a desired size and cross-section is carried out to produce a copper alloy conductor used in the present invention. In the present invention, conditions for, in particular, the first cold-rolling step [Step 6], the first annealing step [Step 7], and the second annealing step [Step 9] may be appropriately controlled to yield a copper alloy conductor having favorable tensile strength and electrical conductivity from the RD direction to the TD direction of the copper alloy conductor and further excellent heat resistance.

In the dissolving/casting step [Step 1], a copper material is dissolved and cast to obtain an ingot. The copper material has a composition where the total content of metal components selected from Al, Be, Cd, Mg, Pb, Ni, P, Sn, and Cr is from 0.1 to 2.0 ppm and the content of copper is 99.96 mass % or higher. In the homogenization heat treatment step [Step 2], the obtained ingot is subjected to a homogenization heat treatment at a holding temperature of 700 to 1000° C. for a retention time of 10 min to 20 hours. In the hot-rolling step [Step 3], hot rolling was carried out to have a total rolling rate of from 10 to 90% [Step 3]. Then, rapid cooling was conducted at a cooling rate of 10° C./sec or higher [Step 4]. Then, both surfaces of the cooled material were each ground by about 1.0 mm [Step 5]. This can remove an oxide layer from the surface of the copper alloy conductor.

In the first cold-rolling step [Step 6], multiple cold-rolling processes are carried out to have a total rolling rate of 75% or higher. When the total rolling rate in the first cold-rolling step [Step 6] is less than 75%, a desired texture cannot be obtained.

In the first annealing step [Step 7], heat treatment is carried out under conditions at a temperature increase rate of 1 to 100°/sec, an end-point temperature of from 100 to 500° C., a retention time of from 1 to 900 sec, and a cooling rate of 1 to 50° C./sec. When the respective heat treatment conditions in the first annealing step are out of the above ranges, a desired texture cannot be obtained.

In the second cold-rolling step [Step 8], cold-rolling is carried out to have a total rolling rate of 60% to 95%.

In the second annealing step [Step 9], heat treatment is carried out under conditions at a temperature increase rate of 10 to 100°/sec, an end-point temperature of from 200 to 550° C., a retention time of from 10 to 3,600 sec, and a cooling rate of 10 to 100° C./sec. When the respective heat treatment conditions in the first annealing step are out of the above ranges, a desired texture cannot be obtained.

In the finishing rolling step [Step 10], cold-rolling is carried out to have a total rolling rate of from 10 to 60%. In the final annealing step [Step 11], heat treatment is carried out under conditions at an end-point temperature of from 125 to 400° C. In the surface oxide layer-removing step [Step 12], acid washing and polishing are carried out so as to wash and remove an oxide layer from the copper alloy conductor. Note that the rolling rate R (%) in the above rolling step is defined using the formula below:

$$R=\{(t_0-t)/t_0\}\times 100$$

where $t_0$ is the thickness of the copper alloy conductor before rolling and t is the thickness of the copper alloy conductor after rolling.

In the shaping step [Step 13], a copper sheet obtained after the above steps is shaped into conductors with a desired size (wire size). The shaping is not particularly limited and, for example, the copper sheet is sliced into a desired size along a direction (longitudinal direction) to be measured by EBSD and is then processed into a rectangular wire by using, for example, cassette roller dies. In this way, a copper alloy conductor with a desired shape can be obtained. At that time, when the cross-sectional shape of the copper alloy conductor (rectangular conductor) is rectangular, the thickness of the copper sheet is preferably adjusted to a short side of the rectangular conductor. Such shaping makes it possible to produce a copper alloy conductor such that the rolling face of the copper sheet corresponds to a flat surface of the copper alloy conductor and the lateral side of the copper sheet corresponds to an edge surface of the copper alloy conductor, respectively.

[Resin Layer]

An insulated wire according to the present invention includes at least one resin layer directly or indirectly coated on the outer peripheral face of a copper alloy conductor. The shape of the resin layer is not particularly limited and can be designed, if appropriate, depending on the shape of the copper alloy conductor. In the resin layer, an insulating resin is used. In addition, the structure of the resin layer may be a single layer containing such a resin, or multiple layers containing such a resin may be stacked. The thickness of the whole resin layer is not particularly limited and, from the viewpoint of application to electric equipment miniaturized without impairing insulation property, is preferably from 10 μm to 300 μm and more preferably from 20 μm to 200 μm.

<Foamed Insulating Layer>

In the present invention, it is preferable that a resin layer that can be used in an insulated wire, includes a foamed insulating layer containing a foamed thermosetting resin. Such a foamed resin layer exhibits a high vibration damping characteristic because of the presence of foams. As electric equipment carried in vehicles is made smaller, the resin layer covering a conductor is sought to be made thinner. Thus, such a thin resin layer should endure vibrations of automobiles. Accordingly, such an insulated wire may be prepared by combining a copper alloy conductor having the above-described composition and texture as a conductor and a foamed resin layer as a resin layer. In this case, the insulated wire may be used for miniaturized electric equipment carried in, for example, vehicles, and can sufficiently endure vibrations of automobiles. As a result, it is possible to more reliably prevent the resin layers from detaching from the copper alloy conductor. The thickness of the foamed insulating layer is not particularly limited, but is preferably 10 to 200 μm in the present invention. Further, in the present invention, the foamed insulating layer may be composed of 1 layer or a plurality of layers of 2 layers or more.

The raw materials which constitute the foamed insulating layer each are preferably a resin which allows a varnish formation so that an insulating layer (i.e. insulating covering) can be formed by coating and baking it on the copper alloy conductor. In the present invention, as the resin which constitutes the foamed insulating layer, any of thermosetting resins is used. As the thermosetting resin, use may be made of any of conventionally utilized ones. In the present invention, a thermosetting resin is preferred, which is selected from the group consisting of polyamideimide (PAI), polyimide (PI), polyamide (PA), polyetherimide (PEI), polyesterimide (PEsI), and polyethersulfone (PES). In particular, polyamideimide (PAI) and polyimide (PI), each of which is excellent in solvent resistance, are more preferred, and polyamideimide (PAI) is particularly preferred. As the thermosetting resin to be used, 1 kind of the resin may be used alone or 2 kinds or more of the resins may be used by mixing.

As the polyamideimide resin, use may be made of a commercially available product (for example, HI406 (manufactured by Hitachi Chemical Co., Ltd.)) and the like, or use may be made of a product obtained by an ordinary method, for example, by directly allowing to react a tricarboxylic acid anhydride and a diisocyanate in a polar solvent. As the polyimide, use may be made, for example, of: U imide (manufactured by Unitika Ltd.), U-varnish (manufactured by Ube Industries, Ltd.), HCl series (manufactured by Hitachi Chemical Co., Ltd.), AURUM (manufactured by Mitsui Chemicals, Inc.) and the like.

To the thermosetting resin which forms the foamed insulating layer, a thermoplastic resin having a melting point of 240° C. or more in the case of a crystalline resin may be added, or a thermoplastic resin having a glass transition temperature of 240° C. or more in the case of a non-crystalline resin may be added. As the thermoplastic resin for any of those occasions, it is desirable that a storage elastic modulus at 25° C. is 1 GPa or more. By incorporation of the thermoplastic resin, flexibility and elongation characteristics are improved. The glass transition temperature of the thermoplastic resin is preferably 180° C. or more and more preferably from 210° C. to 350° C. An addition amount of such a thermoplastic resin is preferably from 5 mass % to 50 mass % of the resin solid content.

As the thermoplastic resin which can be used for this purpose, a non-crystalline resin is preferred. For example, at least one of the resins selected from polyether imide, polyether sulfone, polyphenylene ether, polyphenyl sulfone (PPSU), and polyimide is preferred. As the polyether imide, for example, ULTEM (manufactured by GE Plastics) and the like may be used. As the polyether sulfone, for example, SUMIKA EXCEL PES (manufactured by Sumitomo Chemical Co., Ltd.), PES (manufactured by Mitsui Chemicals, Inc.), ULTRAZON E (manufactured by BASF Japan Ltd.), RADEL A (manufactured by Solvay Advanced Polymers) and the like may be used. As the polyphenyl ether, for example, ZYLON (manufactured by Asahi Kasei Chemicals), IUPIACE (manufactured by Mitsubishi Engineering-Plastics Corporation) and the like may be used. As the polyphenyl sulfone, for example, RADEL R (manufactured by Solvay Advanced Polymers) and the like may be used. As the polyimide, for example, U-VARNISH (manufactured by Ube Industries, Ltd.), HCl series (manufactured by Hitachi Chemical Co., Ltd.), U-IMIDE (manufactured by Unitika Ltd.), AURUM (manufactured by Mitsui Chemicals, Inc.) and the like may be used. In the point of being soluble in a solvent, polyphenyl sulfone and polyether imide are more preferred.

In the present invention, any of various additives, such as a cell nucleating agent, an oxidation inhibitor, an antistatic agent, an anti-ultraviolet agent, a light stabilizer, a fluorescent brightening agent, a pigment, a dye, a compatibilizing agent, a lubricating agent, a reinforcing agent, a flame retardant, a crosslinking agent, a crosslinking aid, a plasticizer, a thickening agent, a thinning agent, and an elastomer, may be incorporated into the thermosetting resin for forming the foamed insulating layer, to the extent that the characteristics are not affected.

In the foamed insulating layer composed of the thermosetting resin having bubbles, the foam magnification of the foamed insulating layer is preferably 1.2-fold or more, and more preferably 1.4-fold or more. The upper limit of the foam magnification is not particularly limited, but it is usually preferable to set the foam magnification to 5.0-fold or less. The foam magnification is obtained, by measuring the density of a resin coated for foam ($\rho f$) and the density of the resin before foam ($\rho s$) in accordance with an underwater substitution method, and by calculating the foam magnification from ($\rho s/\rho f$).

A bubble diameter contained in the foamed insulating layer, that is, an average bubble diameter of the foamed insulating layer is preferably 10 μm or less, more preferably 5 μm or less, still preferably 3 μm or less, and particularly preferably 1 μm or less. If the average bubble diameter is more than 10 μm, a dielectric breakdown voltage is sometimes lowered. In contrast, the dielectric breakdown voltage can be maintained successfully, by setting the average bubble diameter to 10 μm or less. Moreover, by setting the average bubble diameter to 5 μm or less, or 3 μm or less, the dielectric breakdown voltage can be kept more certainly, in this sequential order. There is no particular limit to the lower limit of the average bubble diameter, but it is practical and preferable to be 1 nm or more.

The average bubble diameter is a value obtained by observing the cross section of the foamed insulating layer using a scanning electron microscope (SEM), selecting randomly a total of 50 bubbles equally from the region in which the bubble density has been observed, and by measuring them in a diameter measurement mode using an image size measurement software (WinROOF, trade name, manufactured by Mitani Corporation), and then by calculating an average of the measured diameters. This bubble diameter can be adjusted by a production process, such as a foam magnification, a concentration, viscosity or temperature of the resin, an addition amount of the foaming agent, and a temperature of the baking furnace.

The foamed insulating layer contains the air, which allows: lowering of relative dielectric constant; and suppression of a partial discharge and a corona discharge, generated at an air gap between wires to which a voltage was applied.

The foamed insulating layer can be obtained by coating and baking an insulating varnish which is a mixture of the thermosetting resin and 2 kinds or more, preferably 3 kinds or more of solvents containing a specific organic solvent and at least one high-boiling solvent, on the periphery of the conductor. The coating of the varnish may be carried out on the conductor, directly or by intervention of another insulating layer (resin layer).

The organic solvent for the varnish that can be used in the foamed insulating layer, acts as a solvent which dissolves the thermosetting resin. This organic solvent is not particularly limited as long as the organic solvent does not inhibit the reaction of the thermosetting resin, and examples thereof include: amide-based solvents, such as N-methyl-2-pyrrolidone (NMP), N,N-dimethylacetamide (DMAC), dimethylsulfoxide, and N,N-dimethylformamide; urea-based solvents, such as N,N-dimethylethyleneurea, N,N-dimethylpropyleneurea, and tetramethylurea; lactone-based solvents, such as γ-butyrolactone and γ-caprolactone; carbonate-based solvents, such as propylene carbonate; ketone-based solvents, such as methyl ethyl ketone, methyl isobutyl ketone, and cyclohexanone; ester-based solvents, such as ethyl acetate, n-butyl acetate, butyl cellosolve acetate, butyl carbitol acetate, ethyl cellosolve acetate, and ethyl carbitol acetate; glyme-based solvents, such as diglyme, triglyme, and tetraglyme; hydrocarbon-based solvents, such as toluene, xylene, and cyclohexane; and sulfone-based solvents, such as sulfolane. Among these, in view of high solubility, high reaction acceleration property or the like, an amide-based solvent or a urea-based solvent is preferred; and in view of having no hydrogen atom that apts to inhibit a crosslinking reaction due to heating or the like, N-methyl-2-pyrrolidone, N,N-dimethylacetamide, N,N-dimethylethyleneurea, N,N-dimethylpropyleneurea or tetramethylurea is further preferred, and N-methyl-2-pyrrolidone is particularly preferred. The boiling point of this organic solvent is preferably 160° C. to 250° C., and more preferably 165° C. to 210° C.

The high-boiling-solvent that can be used for bubble formation is a solvent having a boiling point of preferably 180° C. to 300° C., and more preferably 210° C. to 260° C. Specific examples thereof that can be used include: diethylene glycol dimethyl ether, triethylene glycol dimethyl ether, diethylene glycol dibutyl ether, tetraethylene glycol dimethyl ether, and tetraethylene glycol monomethyl ether. From the viewpoint of having a smaller fluctuation in the bubble size, triethylene glycol dimethyl ether is more preferred. In addition to those, examples that can be used for bubble formation include: dipropylene glycol dimethyl ether, diethylene glycol ethyl methyl ether, dipropylene glycol monomethyl ether, diethylene glycol diethyl ether, diethylene glycol monomethyl ether, diethylene glycol butyl methyl ether, tripropylene glycol dimethyl ether, diethylene glycol monobutyl ether, ethylene glycol monophenyl ether, triethylene glycol monomethyl ether, triethylene glycol butyl methyl ether, polyethylene glycol dimethyl ether, polyethylene glycol monomethyl ether, and propylene glycol monomethyl ether.

The high-boiling solvent may be used one kind thereof, but at least 2 kinds thereof are preferably used in combination, from the viewpoint of achievement of the effect that bubbles are generated in a broad temperature range. Preferred combinations of at least two kinds of the high-boiling-solvents include: tetraethylene glycol dimethyl ether with diethylene glycol dibutyl ether, diethylene glycol dibutyl ether with triethylene glycol dimethyl ether, triethylene glycol monomethyl ether with tetraethylene glycol dimethyl ether, and triethylene glycol butyl methyl ether with tetraethylene glycol dimethyl ether. More preferred combinations include: diethylene glycol dibutyl ether with triethylene glycol dimethyl ether, and triethylene glycol monomethyl ether with tetraethylene glycol dimethyl ether.

The high-boiling-solvent for bubble formation is preferably having a boiling point higher than that of the solvent in which the thermosetting resin is dissolved, and when one kind of the high-boiling-solvent is added to the varnish, it is preferable that the boiling point of the high-boiling-solvent be higher by 10° C. or more than that of the solvent in which the thermosetting resin is dissolved. Furthermore, when one kind of the high-boiling-solvent is used, the high-boiling-solvent takes the role of both a bubble nucleating agent and a foaming agent. On the other hand, when two or more kinds of the high-boiling-solvents are used, the solvent having the highest boiling point acts as a foaming agent, and a high-boiling-solvent for bubble formation having a boiling point that is intermediate acts as a bubble nucleating agent. The solvent having the highest boiling point preferably has a boiling point that is higher by 20° C. or more, and more preferably by 30° C. to 60° C., than the organic solvent of the varnish. The high-boiling-solvent for bubble formation having the intermediate boiling point may have a boiling point that is intermediate between the boiling point of the solvent that acts as a foaming agent and the boiling point of the organic solvent of the varnish, and preferably has a difference in boiling point of 10° C. or more from the boiling point of the foaming agent. In a case where the high-boiling-solvent for bubble formation having the intermediate boiling point has a solubility for the thermosetting resin higher than that of the solvent that acts as a foaming agent, uniform bubbles can be formed after varnish-baking. In the case where 2 or more kinds of the high-boiling-solvents are used, as a use rate thereof, the use rate of a high-boiling solvent having the highest boiling point to a high-boiling-solvent having an intermediate-boiling point is, for example, in terms of mass ratio, preferably from 99/1 to 1/99 and more preferably from 10/1 to 1/10 in the point of easiness in the bubble formation.

(Outer Insulating Layer)

Figure 2:
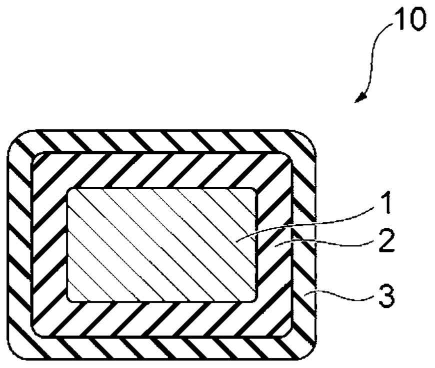
FIG. 2 is a schematic cross-sectional view showing one embodiment of the insulated wire of the present invention.

In the present invention, an outer insulating layer containing a thermoplastic resin may be further formed, on the outer peripheral face of the foamed insulating layer. FIG. 2 is a schematic cross-sectional diagram illustrating an embodiment of an insulated wire 10 according to the present invention, which wire has such a resin layer structure. A foamed insulating layer 2 is formed on the outer peripheral face of a copper alloy conductor 1, and an outer insulating layer 3 is further formed on the outer peripheral face of the foamed insulating layer 2. Using a fact that a shape of the foamed insulating layer 2 can be deformed by incorporating bubbles (the air) therein, air gaps can be filled, by providing a thermoplastic resin layer as an outer insulating layer 3 for the top layer above this foamed insulating layer 2, and, as a result, the insulated wire (or a resin layer) excellent in a performance of suppressing generation of a partial discharge can be obtained. In order to further enhance this effect, it is preferred to use, as a thermoplastic resin that can be used in the outer insulating layer, a thermoplastic resin having a glass transition temperature of 240° C. or more in the case of a non-crystalline resin, or a thermoplastic resin having a melting point of 240° C. or more in the case of a crystalline resin.

In the present invention, as the forgoing thermoplastic resin constituting the outer insulating layer, for example, any of engineering plastics and super engineering plastics are preferred.

Examples of the engineering plastics and the super engineering plastics include: general-purpose engineering plastics, such as polyamide (PA) (nylon), polyacetal (POM), polycarbonate (PC), polyphenylene ether (including a modified polyphenylene ether), polybutylene terephthalate (PBT), polyethylene terephthalate (PET), a syndiotactic polystyrene resin (SPS), polyethylene naphthalate (PEN), and super-high-molecular polyethylene; in addition, super engineering plastics, such as polysulfone (PSF), polyether sulfone (PES), polyphenylene sulfide (PPS), polyarylate (U polymer), polyamideimide, polyetherketone (PEK), polyaryletherketone (PAEK), polyetheretherketone (PEEK), a modified polyetheretherketone, polyetherketoneketone (PEKK), polyetherketoneetherketoneketone (PEKEKK), polyimide (PI), a thermoplastic polyimide resin (TPI), polyamideimide (PAI), and a liquid-crystal polyester; further a polymer alloy containing polyethylene terephthalate (PET) or polyethylene naphthalate (PEN) as a base resin; and a polymer alloy containing any of the forgoing engineering plastics, such as ABS/polycarbonate, polyphenylene ether/nylon 6,6, polyphenylene ether/polystyrene, and polybutylene terephthalate/polycarbonate. In the present invention, use can be particularly preferably made of: a syndiotactic polystyrene resin (SPS), polyphenylene sulfide (PPS), polyaryletherketone (PAEK), polyetheretherketone (PEEK), and a thermoplastic polyimide resin (TPI), from the viewpoint of heat resistance and stress cracking resistance. Further, the resin to be used is not limited by the resin names described above, but as a matter of course, resins other than the exemplified resins can be also used, as long as they are more excellent in performance than the exemplified resins.

Among these thermoplastic resins, examples of the crystalline thermoplastic resins include: general-purpose engineering plastics, such as polyamide (PA), polyacetal (POM), polybutylene terephthalate (PBT), polyethylene terephthalate (PET), polyphenylene sulfide (PPS), and super-high-molecular polyethylene; polyetheretherketone (PEEK) (including a modified PEEK); polyetherketone (PEK); polyetherketoneketone (PEKK); polyetherketoneetherketoneketone (PEKEKK); polyaryletherketone (PAEK); and a thermoplastic polyimide resin (TPI). Further, the thermoplastic resin includes a polymer alloy using the above-described crystalline thermoplastic resin. On the other hand, examples of the non-crystalline thermoplastic resins include: polycarbonate (PC), polyphenylene ether, polyarylate, a syndiotactic polystyrene resin (SPS), polyamideimide (PAI), polybenzimidazole (PBI), polysulfone (PSF), polyethersulfone (PES), polyetherimide (PEI), polyphenyl sulfone (PPSU), a non-crystalline thermoplastic polyimide resin, and the like.

In the present invention, the thermoplastic resin constituting the outer insulating layer is preferably a resin selected from the group consisting of polyetheretherketone (PEEK), a modified polyetheretherketone, polyetherketoneketone (PEKK), polyetherketone (PEK), polyetherketoneetherketoneketone (PEKEKK), polyphenylene sulfide (PPS) and a thermoplastic polyimide (TPI); and PEEK and a modified PEEK are particularly preferable.

The thermoplastic resin for forming the outer insulated layer may contain any of various additives, within the range in which the characteristics are not affected, such as an antioxidant, an antistatic agent, an ultraviolet radiation inhibitor, a light stabilizer, a fluorescent whitening agent, a pigment, a dye, a compatibilizer, a lubricant, a reinforcing agent, a flame retardant, a crosslinking agent, a crosslinking co-agent, a plasticizer, a thickening agent, a viscosity reducer, and an elastomer.

The thickness of the outer insulating layer is not particularly restricted, but the thickness of 20 to 150 μm is practical and preferred. A thickness ratio of the foamed insulating layer and the outer insulating layer is only required to be appropriate. Specifically, as the thickness of the foamed insulating layer is made higher, the relative dielectric constant lowers, so that the partial discharge inception voltage can be made higher. On the other hand, in the case where making mechanical characteristics, such as mechanical strength and flexibility, higher or enhanced is desired, the outer insulating layer is only designed so as to make it thick. If the thickness ratio of the foamed insulating layer and the outer insulating layer, that is, the ratio of (thickness of the foamed insulating layer)/(thickness of the outer insulating layer) is from 5/95 to 95/5, features of the mechanical strength and the partial discharge inception voltage are developed. In the case where the mechanical characteristics are expected, in particular, the thickness ratio of from 5/95 to 60/40 is preferred.

<Producing of Insulated Wire Containing Foamed Insulating Layer>

An insulated wire containing resin layers including a foamed insulating layer can be produced as follows. The above copper alloy conductor as so produced is used as a conductor, and a varnish for forming a foamed insulating layer is applied therearound. The varnish may be prepared by mixing: the above organic solvent that can dissolve a thermosetting resin as a component of the foamed insulating layer; a high-boiling-point solvent that is used for foaming and acts as a foaming agent; and optionally, a solvent containing a high-boiling-point solvent that is used for foaming, has an intermediate boiling point, and acts as a foam nucleating agent. Then, in the course of heating and burning the varnish, the organic solvent is vaporized, to generate foams in the varnish. Then, a foamed insulating layer having foams are formed on the outer peripheral face of the copper alloy conductor. In addition, when an outer insulating layer is formed on the outer peripheral face of the foamed insulating layer, a thermoplastic resin composition as a component of the outer insulating layer may be extruded to provide the outer insulating layer on the outer peripheral face of the foamed insulating layer.

<Enamel Insulating Layer and Extruded Insulating Layer>

Figure 3:
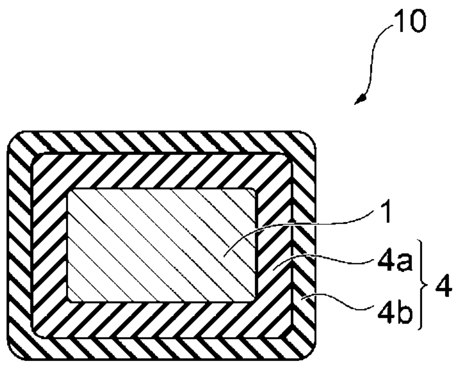
FIG. 3 is a schematic cross-sectional view showing another embodiment of the insulated wire of the present invention.

In the present invention, it is preferable that the resin layers that can be used in an insulated wire include: at least one enamel insulating layer; and an extruded insulating layer that is coated on the outer peripheral face of the enamel insulating layer and that contains a thermoplastic resin. FIG. 3 is a schematic cross-sectional diagram illustrating an embodiment of an insulated wire 10 according to the present invention, which has such a resin layer structure. As resin layers 4, an enamel insulating layer 4*a* is formed on the outer peripheral face of a copper alloy conductor 1, and an extruded insulating layer 4*b* is further formed on the outer peripheral face of the enamel insulating layer 4*a*. The resin layers 4 as so structured have the enamel insulating layer 4*a* interposed between the extruded insulating layer 4*b* and the copper alloy conductor 1. Thus, while the tight attachment between the copper alloy conductor 1 and the extruded insulating layer 4*b* is reinforced, extrusion coating allows for the firm extruded insulating layer 4*b* coating on the enamel insulating layer 4*a*. As electric equipment carried in vehicles are made smaller, conductors are sought to be made thinner. Thus, each conductor should be more tightly attached to the resin layers. Accordingly, the resin layers as so structured may be coated on a copper alloy conductor having the above-described specific composition and texture. In this case, the copper alloy conductor is more firmly and tightly attached. As a result, it is possible to more reliably prevent the resin layers from detaching from the copper alloy conductor.

<Enamel Insulating Layer>

The enamel insulating layer is formed from a thermosetting resin. In the present invention, it is particularly preferable that the insulated wire has an enamel insulating layer and an extruded insulating layer in this order from the copper alloy conductor, and that the enamel insulating layer in particular is provided on the outer periphery of the copper alloy conductor so as to be in direct contact with the copper alloy conductor. However, according to necessity or the purpose, it is also acceptable that another insulating layer (another resin layer) is provided between the copper alloy conductor and the enamel insulating layer. Hereinafter, the enamel insulating layer may be simply referred to as enamel layer.

(Thermosetting Resin)

As the enamel resin forming the enamel layer, a conventionally used resin can be used as long as it is a thermosetting resin. Examples thereof include polyamideimide (PAI), polyimide (PI), polyetherimide (PEI), polyesterimide (PEsI), polyurethane (PU), polyester (PEst), polybenzimidazole, a melamine resin, an epoxy resin, and the like. Of these resins, polyamideimide (PAI), polyimide (PI), polyetherimide (PEI), polyesterimide (PEsI), polyurethane (PU), and polyester (PEst) are preferred. Especially, a thermosetting resin having an imide bond is preferred. Specific examples of the thermosetting resin having an imide bond include: as in the above, polyamideimide (PAI), polyimide (PI), polyetherimide (PEI), and polyesterimide (PEsI). In the present invention, a resin which is selected from the group consisting of polyamideimide (PAI), polyimide (PI) and polyetherimide (PEI) is particularly preferred.

The polyamideimide (PAI), when compared to the other resins, has a lower thermal conductivity and a higher dielectric breakdown voltage, and a bake-setting (sinter-setting) can be conducted. The polyamideimide is not particularly limited. Examples thereof include: polyamideimides obtained by a usual method, for example, a method in which a tricarboxylic anhydride and a diisocyanate compound are directly reacted in a polar solvent, or a method in which a diamine compound is reacted with a tricarboxylic anhydride in a polar solvent, to previously introduce an imide bond to the reaction product, and then the reaction product is subjected to amidation using a diisocyanate compound. Examples of the commercially available polyamideimide (PAI) include: HPC-9000 (manufactured by Hitachi Chemical Co., Ltd.), H1406 (manufactured by Hitachi Chemical Co., Ltd.), and the like.

The polyimide (PI) is not particularly limited, but use may be made of: any of usual polyimide resins, such as a whole aromatic polyimide and a thermosetting aromatic polyimide. Alternatively, use may be made of polyimides obtained by a usual method in which an aromatic tetracarboxylic dianhydride and an aromatic diamine compound are reacted in a polar solvent to obtain a polyamide acid solution, and then the obtained polyamide acid solution is subjected to imidization by a thermal treatment at the time of baking. Examples of the commercially available polyimide (PI) include: U-IMIDE (manufactured by Unitika Ltd.), U-VARNISH-A (manufactured by Ube Industries, Ltd.), #3000 (manufactured by Du Pont-Toray Co., Ltd.), and the like.

The polyetherimide (PEI) is permissible, as long as it is a thermosetting resin having an ether bond and an imide bond in the molecule. For example, it is also possible to use a product obtained by using a polyamidic acid solution obtained by reacting, in a polar solvent, an aromatic tetracarboxylic acid dianhydride and an aromatic diamine having an ether bond in the molecule, and then by subjecting the polyamidic acid solution to imidization due to a heating treatment for baking. Examples of the commercially available polyetherimide (PEI) include: ULTEM1000 (manufactured by SABIC), and the like.

The polyesterimide (PEsI) is not particularly limited, as long as it is a polymer having an ester bond and an imide bond in the molecule, and it is thermosetting. For example, it is also possible to use a product obtained by forming an imide bond from a tricarboxylic acid anhydride and an amine compound, and forming an ester bond from an alcohol and a carboxylic acid or an alkyl ester thereof, and making a free acidic group or anhydride group of the imide bond join in the ester formation reaction. As such a polyesterimide, for example, it is also possible to use a product obtained by reacting a tricarboxylic acid anhydride, a dicarboxylic acid compound or its alkyl ester, an alcohol compound, and a diamine compound, in accordance with any method. Examples of the commercially available polyesterimide (PEsI) include: Neoheat8600A (manufactured by Toutoku Toryo Co., Ltd.), and the like.

The relative permittivity of the thermosetting resin is preferably 3.0 to 4.5, more preferably 3.0 to 4.0, and further preferably 3.0 to 3.5. Meanwhile, the relative permittivity can be obtained by providing an electrode on the surface of a wire using a conductive paste, measuring the electrostatic capacity between the conductor and the electrode using a measuring apparatus such as a commercially available LCR meter, and calculating the relative permittivity from the length of the electrode and the thickness of the insulating coated layer. Unless particularly stated otherwise, the relative permittivity according to the present invention means a value measured in a constant temperature tank at 100° C. Furthermore, in regard to the frequency, the value may be varied as necessary; however, unless particularly stated otherwise, the relative permittivity according to the present invention means a value measured at 100 Hz.

In the case of a laminated enamel insulating layers, the relative permittivities at 25° C. of the thermosetting resins of the respective enamel insulating layers may be identical or may be different; however, it is preferable that the relative permittivities are different. Particularly, it is more preferable that the relative permittivity of the thermosetting resin on the copper alloy conductor is higher. In this way by use of the thermosetting resin, the electric field at the interface with the copper alloy conductor is lowered, and an excellent withstand voltage can be obtained without being affected by any damage or foreign materials on the copper alloy conductor.

Regarding the thermosetting resin, one kind may be used alone, or two or more kinds may be used in combination, in the same enamel insulating layer. Furthermore, the thermosetting resins to be used in different enamel insulating layers may be thermosetting resins that are different from each other or may be the same resin, except for a case in which the enamel insulating layers are adjacent to each other.

(Additive)

Adhesion strength of the thermosetting resin layer to the copper alloy conductor can be further enhanced, by adding thereto any of additives, such as trialkyl amines, an alkoxylated melamine resin, and a thiol compound.

Preferable trialkyl amines include trialkyl amines having a lower alkyl group, such as trimethyl amine, triethyl amine, tripropyl amine, and tributyl amine. Of these amines, trimethyl amine and triethyl amine are more preferable in the points of both flexibility and adhesion property.

As the alkoxylated melamine resin, use can be made of melamine resins substituted with a lower alkoxy group, such as a butoxylated melamine resin and a methoxylated melamine resin, and in the point of compatibility of the resin, a methoxylated melamine resin is preferable.

The thiol compound means an organic compound having a mercapto group (—SH), and specific examples thereof include pentaerythritol tetrakis(3-mercaptobutylate), 1,3,5-tris(3-mercaptobutyloxyethyl)-1,3,5-triazine-2,4,6(1H,3H,5H)-trione, butanediol bis(3-mercaptobutylate), butanediol bis(3-mercaptopentylate), 5-amino-1,3,4-tiadiazole-2-thiol, trimethylolpropane tris(3-mercaptobutylate), 5-methyl-1,3,4-thiadiazole-2-thiol, 2,5-dimercapto-1,3,4-thiadiazole, 2-amino-1,3,4-thiadiazole, 1,2,4-thiadiazole-3-thiol, 3-amino-5-mercapto-1,2,4-triazole, and the like.

The content of the above-described additives is not particularly limited. However, with respect to 100 mass parts of the thermosetting resin, 5 mass parts or less of the additive is preferable and 3 mass parts or less of the additive is more preferable. In the present invention, even if only the contents or types of the additives are different between different enamel insulating layers, those layers are counted as different layers.

There may be one enamel insulating layer, or two or more enamel insulating layers may be laminated. In the present invention, the number of layers for the enamel insulating layer is preferably 1 to 4, more preferably 1 to 3, and further preferably 1 or 2.

From the standpoint that even if a thickness of the enamel layer is made thick whereby a high-partial discharge inception voltage can be attained, the number of passages through a baking furnace can be reduced when the enamel layer is formed, and adhesion between the copper alloy conductor and the enamel layer can be prevented from being extremely lowered, and from the standpoint that generation of air bubbles can be prevented, the thickness of the enamel layer is preferably 60 μm or less, more preferably 50 μm or less, further preferably 45 μm or less, and particularly preferably 40 μm or less. Further, in order to prevent deterioration of voltage resistance or heat resistance, which are properties required for the enameled wires as the resin layer of the insulated wire, it is preferable that the enamel layer has a certain thickness. The thickness of the enamel layer is not particularly limited, as long as it at least has a thickness where no pinholes are formed. The thickness of the enamel layer is preferably 3 μm or more, more preferably 6 μm or more. The thickness of the enamel insulating layer is the sum of the enamel insulating layers existing between the copper alloy conductor and the extruded insulating layer. In the case of a laminated enamel insulating layer, the thicknesses of the respective enamel insulating layers may be identical with or different from each other. It is preferable that the thicknesses are different, and it is preferable that the thickness becomes larger as the enamel insulating layer is farther from the copper alloy conductor.

<Extruded Insulating Layer>

The extruded insulating layer contains a thermoplastic resin. In the present invention, the extruded insulating layer is such that at least one layer of the extruded insulating layer is provided on at least one layer of the enamel insulating layer. The extruded insulating layer may be a single layer or may have a laminated structure of two or more layers.

(Thermoplastic Resin)

Examples of the thermoplastic resin include: commodity engineering plastics, such as polyamide (PA) (nylon), polyacetal (POM), polycarbonate (PC), polyphenylene ether (including a modified polyphenylene ether), polybutylene terephthalate (PBT), polyethylene terephthalate (PET), polyethylene naphthalate (PEN), and ultrahigh molecular weight polyethylene; and, in addition, super engineering plastics, such as polysulfone (PSF), polyether sulfone (PES), polyphenylene sulfide (PPS), polyarylate (U polymer), polyetherketone (PEK), polyaryletherketone (PAEK), tetrafluoroethylene/ethylene copolymer (ETFE), polyetheretherketone (PEEK) (including a modified polyetheretherketone (modified PEEK)), polyetherketoneketone (PEKK), polyetherketoneetherketoneketone (PEKEKK), tetrafluoroethylene/perfluoalkyl vinyl ether copolymer (PFA), polytetrafluoroethylene (PTFE), thermoplastic polyimide resin (TPI), thermoplastic polyamideimide (TPAI), and liquid crystal polyester; and further polymer alloy composed of polyethylene terephthalate (PET) or polyethylene naphthalate (PEN) as a base resin, ABS/polycarbonate, NYLON 6,6, aromatic polyamide resin (aromatic PA), polymer alloys containing the foregoing engineering plastics, such as polyphenylene ether/NYLON 6,6, polyphenylene ether/polystyrene, and polybutylene terephthalate/polycarbonate.

Whether the thermoplastic resin is crystalline or non-crystalline does not matter. Further, whether the thermoplastic resin is one kind or a mixture of 2 kinds or more does not matter.

In the present invention, as the thermoplastic resin, it is preferred a resin selected from the group consisting of: polyetheretherketone (PEEK), a modified polyetheretherketone, polyetherketoneketone (PEKK), polyetherketone (PEK), polyetherketoneetherketoneketone (PEKEKK), polyphenylene sulfide (PPS), and a thermoplastic polyimide (TPI). In particular, polyetheretherketone (PEEK) and polyphenylene sulfide (PPS) are more preferred, from the viewpoint of solvent resistance.

The relative permittivity of the thermoplastic resin is preferably 2.0 to 4.0, more preferably 2.0 to 3.5, and further preferably 2.0 to 3.0.

In the case of a laminated extruded insulating layer, the relative permittivities of the thermoplastic resins of the respective extruded insulating layers may be identical or different, and it is preferable that the relative permittivities are different. Furthermore, it is preferable that the relative permittivity of the outermost layer is higher. In this manner of the laminated structure of the extruded insulating layers, the electric field of the outermost layer is lowered, and an excellent withstand voltage that is not easily affected by an external damage to the resin layer can be obtained.

The extruded insulating layer may be a single layer or may be a laminate of two or more layers. In the present invention, the number of layers of the extruded insulating layer is preferably 1 to 4, more preferably 1 to 3, and further preferably 1 or 2.

The thickness of the extruded insulating layer may be identical with or different from the thickness of the enamel insulating layer. In the present invention, the thickness of the extruded insulating layer is preferably 10 to 200 μm, more preferably 40 to 150 μm, and further preferably 60 to 100 μm. Meanwhile, the thickness of the extruded insulating layer is the sum total of the extruded insulating layers existing on the enamel insulating layer.

In the case of a laminated extruded insulating layer, the thicknesses of the respective extruded insulating layers may be identical with or different from each other. In the present invention, the thickness of each of the extruded insulating layers is preferably 10 μm or more, more preferably 30 μm or more, and further preferably 50 μm or more. In the present invention, the upper limit of the thickness of each of the extruded insulating layers is preferably 100 μm or less, more preferably 90 μm or less, and further preferably 80 μm or less.

Since the extruded insulating layer is formed by using a thermoplastic resin, the extruded insulating layer is usually formed by extrusion-forming.

(Additive)

In the extruded insulating layer, any of variety of additives may be incorporated for any purpose. Examples of these additives include a pigment, a cross-linker, a catalyst, and an antioxidant. The content of any of these additives is preferably from 0.01 to 10 parts by mass with respect to 100 parts by mass of the resin which constitutes the extruded insulating layer.

In the present invention, in an extruded insulating layer of an outermost layer which covers a copper alloy conductor, it is also possible to use a self-lubricating resin formed by dispersing and mixing a wax, a lubricant and the like according to an ordinary method. As the wax, usually materials for use may be used without any particular limitation. Examples thereof include: a synthetic wax, such as polyethylene wax, petroleum wax, and paraffin wax; and a natural wax, such as carnauba wax, candelilla wax, and rice wax. The lubricant may be also used without any particular limitation. Examples thereof include silicone, silicone macromonomer, a fluorine resin, and the like.

<Method of Producing Insulated Wire Containing Resin Layers Including Enamel Insulating Layer and Extruded Insulating Layer>

In the present invention, a thermosetting resin varnish for forming the enamel insulating layer is coated on the outer periphery of the thus-prepared copper alloy conductor as a conductor, and then baked, to form an enamel insulating layer composed of the thermosetting resin. Then, a composition containing a thermoplastic resin for forming the extruded insulating layer is further coated on the enamel insulating layer by an extrusion-molding, to form an extruded insulating layer on the outer periphery of the enamel insulating layer.

The thermosetting resin varnish contains an organic solvent and the like, so as to make the thermosetting resin be a varnish. The organic solvent is not particularly limited as long as the organic solvent does not inhibit the reaction of the thermosetting resin, and examples thereof include: amide-based solvents, such as N-methyl-2-pyrrolidone (NMP), N,N-dimethylacetamide (DMAC), and N,N-dimethylformamide (DMF); urea-based solvents, such as N,N-dimethylethyleneurea, N,N-dimethylpropyleneurea, and tetramethylurea; lactone-based solvents, such as γ-butyrolactone and γ-caprolactone; carbonate-based solvents, such as propylene carbonate; ketone-based solvents, such as methyl ethyl ketone, methyl isobutyl ketone, and cyclohexanone; ester-based solvents, such as ethyl acetate, n-butyl acetate, butyl cellosolve acetate, butyl carbitol acetate, ethyl cellosolve acetate, and ethyl carbitol acetate; glyme-based solvents, such as diglyme, triglyme, and tetraglyme; hydrocarbon-based solvents, such as toluene, xylene, and cyclohexane; phenol-based solvents, such as cresol, phenol, and halogenated phenol; sulfone-based solvents, such as sulfolane; and dimethylsulfoxide (DMSO).

Of these organic solvents, in view of high solubility, high reaction acceleration property and the like, amide-based solvents and urea-based solvents are preferred; and in view of a compound without having any hydrogen atom that is apt to inhibit a crosslinking reaction due to heating, N-methyl-2-pyrrolidone (NMP), N,N-dimethylacetamide, N,N-dimethylethyleneurea, N,N-dimethylpropyleneurea, and tetramethylurea are more preferred; and N,N-dimethylacetamide, N-methyl-2-pyrrolidone, N,N-dimethylformamide, and dimethylsulfoxide are particularly preferred. Regarding the organic solvent, one kind may be used alone, or two or more kinds may be used in mixture.

As a thermosetting resin varnish, commercially-available products may be used as mentioned above. In this case, since the thermosetting resin is dissolved in an organic solvent, the varnish contains the organic solvent.

The method of coating the thermosetting resin varnish on the copper alloy conductor may be pursued in the usual manner. Examples of the coating method include: a method of employing a die for a varnish coating, which has been manufactured so as to be similar to the shape of the conductor; and a method of employing a die that is called "universal die", which has been formed in a curb shape. The copper alloy conductor having the thermosetting resin varnish coated thereon is baked by a baking furnace in a usual manner. Although specific baking conditions depend on the shape of a furnace to be used, in the case where the furnace is an about 8 m-sized vertical furnace by natural convection, the baking can be achieved by setting the passing time period to 10 to 90 sec at the furnace temperature of 400 to 650° C.

In the present invention, an insulated wire can be obtained, by using a copper alloy conductor having an enamel insulating layer formed thereon (also referred to as enamel wire) as a core wire, extrusion-coating the enamel wire with a composition including a thermoplastic resin for forming the extruded insulating layer, using a screw of an extruder, and thereby forming an extruded insulating layer on the enamel wire. At this time, extrusion coating of the thermoplastic resin is carried out, using an extrusion die at a temperature higher than or equal to the melting point of the thermoplastic resin (in the case of using a non-crystalline resin, a temperature higher than or equal to the glass transition temperature), so that the external shape of the cross-section of the extruded insulating layer to be extruded has a similar shape or an approximately similar shape to the shape of the copper alloy conductor, and the external shape becomes a shape with which predetermined thicknesses of sides and corners and predetermined maximum thickness and minimum thickness are obtained. In addition, the extruded insulating layer can also be formed using an organic solvent and the like and the thermoplastic resin.

In a case of using a non-crystalline thermoplastic resin for the extruded insulating layer, aside from the extrusion-forming, for example, the thermoplastic resin layer can be also formed by coating and baking a varnish of the thermoplastic resin having been dissolved in an organic solvent or the like on an enamel wire, using a die whose shape has the similarity in the shape of the conductor. As the organic solvent for the thermoplastic resin varnish, the organic solvents cited in the thermosetting resin varnish are preferable. Further, specific baking conditions depend on a shape of the furnace to be used. However, such conditions as described about the thermosetting resin are preferable. Further, however, in the present invention, from the viewpoint of production suitability taking production costs into account, the extruded insulating layer is preferable to be provided by extrusion-forming.

EXAMPLES

The present invention will be described in more detail based on examples given below, but the invention is not meant to be limited by these.

Examples 1 to 13 and Comparative Examples 1 to 17

First, each of copper materials having the composition shown in Table 1 was dissolved and cast, to obtain an ingot ([Step 1]). The obtained ingot was subjected to homogenization heat treatment at a holding temperature of 700 to 1,000° C. for a retention time of 10 min to 20 hours [Step 2]. Then, hot rolling was carried out to have a total rolling rate of from 10 to 90% [Step 3]. Then, rapid cooling was conducted at a cooling rate of 10° C./sec or higher [Step 4]. Then, both surfaces of the cooled material were each ground by about 1.0 mm [Step 5]. Then, first cold-working was carried out at a total rolling rate designated in Table 2 [Step 6]. Then, first annealing was carried out at a temperature increase rate, an end-point temperature, a retention time, and a cooling rate designated in Table 2 [Step 7]. Then, second cold-rolling was carried out at a total rolling rate designated in Table 2 [Step 8]. After second annealing was carried out at a temperature increase rate, an end-point temperature, a retention time, and a cooling rate designated in Table 2 [Step 9], finish rolling was carried out at a total rolling rate designated in Table 2 [Step 10]. Final annealing was then carried out under conditions at an end-point temperature of from 125 to 400° C. [Step 11], followed by acid washing and polishing [Step 12], to produce each of the copper sheets with the respective desired thickness. Thereafter, the resulting copper sheet was sliced into a certain size along a direction to be measured by EBSD, and was worked via cassette roller dies into a rectangular wire [Step 13]. In this way, each copper alloy conductor (specimen) was produced.

Then, two produced copper alloy conductors were provided for each of respective Examples or respective Comparative Examples. Resin layers including a foamed insulating layer were formed on the outer peripheral face of one of the copper alloy conductor, and resin layers including an enamel insulating layer and an extruded insulating layer were formed on the outer peripheral face of the other copper alloy conductor, in accordance with the above-described production method. Note that each resin layer was likewise formed under common production conditions. At that time, polyamide imide (PAI) was used as a thermosetting resin as a component of the foamed insulating layer or the enamel insulating layer, and polyetheretherketone (PEEK) was used as a thermoplastic resin as a component of the extruded insulating layer.

(Measurement Method and Evaluation Method)

<To Quantify Metal Components>

Each specimen thus-produced was analyzed using VG-9000 (manufactured by V.G. Scientific, Inc.). Table 1 shows the content (ppm) of Al, Be, Cd, Mg, Pb, Ni, P, Sn, and Cr included in each specimen and the total content (ppm) of Al, Be, Cd, Mg, Pb, Ni, P, Sn, and Cr (simply referred to as “Total of metal components” in Table 1), as well as the content (mass %) of Cu. Note that each specimen may contain unavoidable impurities. In addition, the “-” in Table 1 means that the corresponding metal component was undetected.

<Orientation Density>

Orientation density was measured, using OIM 5.0 HIKARI (manufactured by TSL, Inc.), by EBSD. The measurement area was in an area of 800 μm×1,600 μm containing 200 or more grains, and the scan step was set to 0.1 μm. The measured grains were analyzed by analysis software using OIM Analysis (manufactured by TSL, Inc.). The crystal orientation distribution function obtained by the analysis was expressed using Euler angles. From the cross-section map where $\varphi 2=0$ degrees, the average orientation density in an area (indicated as “Area A” in Table 3) where $\varphi 1=0$ degrees and $\Phi$=from 0 degrees to 90 degrees, was calculated. In addition, in the cross-section map where $\varphi 2=35$ degrees as expressed using Euler angles, the maximum orientation density in an area (indicated as “Area B” in Table 3) where $\varphi 1$=from 45 degrees to 55 degrees and $\Phi$=from 65 degrees to 80 degrees, was retrieved. Table 3 shows, for each specimen, the average orientation density in the Area A (Av. orientation density in Area A) and the maximum orientation density in the Area B (Max. orientation density in Area B).

<Average Grain Size (Av. Grain Size)>

Average grain size was measured in the same manner as for the orientation density. The average grain size was calculated from the whole grains included in the measurement area. Table 3 shows the average grain size of each specimen.

<Electrical Conductivity (EC)>

Electrical conductivity was calculated from numerical values for specific resistance measured, in a thermostat kept at 20° C. (±0.5° C.), by a four-terminal method. Note that the inter-terminal distance was set to 100 mm. The case where the electrical conductivity was 95% IACS or higher was evaluated as “Good”, and the case where the electrical conductivity was less than 95% IACS was evaluated as “Poor”. Table 3 shows the electrical conductivity of each specimen.

<Tensile Strength (TS)>

Three JIS Z2201-13B test pieces were cut out in the RD direction of each specimen. Tensile strength of each test piece was measured, according to JIS Z2241, and then averaged. The case where the tensile strength was from 150 MPa to 330 MPa was evaluated as “Good”, and the case where the tensile strength was less than 150 MPa or exceeded 330 MPa was evaluated as “Poor”. Table 3 shows the tensile strength of each specimen.

<Heat Resistance>

Each specimen was subjected to heat treatment for 5 h at 800° C. in a tubular furnace under an argon atmosphere or a nitrogen atmosphere. Then, the average grain size was measured in the same manner as for the above average grain size measurement method. The case where the after heat-treatment average grain size was 200 μm or less the heat-resistance was evaluated as “Excellent”, and the case of exceeding 200 μm it was evaluated as “Poor”. Table 3 shows the after heat-treatment average grain size of each specimen (Av. grain size after heating). Generally speaking, the size of grains grows more as heat treatment is carried out for a longer period and/or at a higher temperature. That is, it is obvious that the average grain size is 200 μm or less if a specimen is subjected to heat treatment at from 700 to 800° C. for from 10 min to 5 h, when the specimen is subjected to heat treatment at 800° for 5 h to have an average grain size of 200 μm or less.

TABLE 1

| | Composition | | | | | | | | | | |
|---|---|---|---|---|---|---|---|---|---|---|---|
| | Al | Be | Cd | Mg | Pb | Ni (ppm) | P | Sn | Cr | Total of metal components | Cu (mass %) |
| Ex. 1 | 1.0 | — | — | — | — | — | 0.8 | — | 0.1 | 1.9 | ≥99.99 |
| Ex. 2 | — | — | — | — | — | 1.9 | — | — | — | 1.9 | ≥99.99 |
| Ex. 3 | — | — | — | — | 0.1 | — | — | 1.8 | — | 1.9 | ≥99.99 |
| Ex. 4 | — | — | 1.9 | — | — | — | — | — | — | 1.9 | ≥99.99 |
| Ex. 5 | — | 1.7 | — | — | — | — | 0.1 | — | — | 1.8 | ≥99.99 |
| Ex. 6 | — | — | — | 0.9 | — | — | | — | — | 0.9 | ≥99.99 |
| Ex. 7 | 1.0 | — | — | — | — | | 0.8 | — | 0.1 | 1.9 | ≥99.99 |
| Ex. 8 | — | — | — | — | — | 1.9 | — | — | — | 1.9 | ≥99.99 |
| Ex. 9 | — | — | — | — | 0.1 | — | — | 1.8 | — | 1.9 | ≥99.99 |
| Ex. 10 | — | — | 1.9 | — | — | — | — | — | — | 1.9 | ≥99.99 |
| Ex. 11 | — | 1.7 | — | — | — | — | 0.1 | — | — | 1.8 | 99.98 |
| Ex. 12 | — | — | — | 0.9 | — | — | — | — | — | 0.9 | 99.98 |
| Ex. 13 | 0.8 | — | — | — | 0.5 | — | — | — | 0.7 | 2.0 | 99.98 |
| CEx. 1 | — | — | — | — | — | — | 5.0 | — | — | 5.0 | ≥99.99 |
| CEx. 2 | — | — | 85.0 | — | — | — | — | — | — | 85.0 | ≥99.99 |
| CEx. 3 | — | — | — | — | 150.0 | — | — | — | — | 150.0 | 99.97 |
| CEx. 4 | 120.0 | — | — | — | — | — | — | — | — | 120.0 | 99.98 |
| CEx. 5 | — | — | — | — | — | — | — | — | 250.0 | 250.0 | 99.96 |
| CEx. 6 | — | — | — | — | — | — | — | 300.0 | — | 300.0 | 99.96 |
| CEx. 7 | — | 130.0 | — | — | — | — | — | — | — | 130.0 | 99.98 |
| CEx. 8 | — | — | — | — | — | 275.0 | — | — | — | 275.0 | 99.96 |
| CEx. 9 | — | — | — | 1.3 | — | — | — | — | — | 1.3 | 99.00 |
| CEx. 10 | — | 1.8 | — | — | — | — | — | — | — | 1.8 | ≥99.99 |
| CEx. 11 | — | — | — | — | — | — | 1.9 | — | — | 1.9 | ≥99.99 |
| CEx. 12 | — | — | 1.4 | — | — | — | — | 0.3 | — | 1.7 | ≥99.99 |
| CEx. 13 | 0.9 | — | — | — | 0.5 | — | — | — | 0.3 | 1.7 | ≥99.99 |
| CEx. 14 | — | 0.1 | — | 0.3 | — | — | 1.5 | — | — | 1.9 | ≥99.99 |
| CEx. 15 | — | — | 0.2 | — | — | 0.3 | 1.0 | — | 0.1 | 1.6 | ≥99.99 |
| CEx. 16 | — | 0.1 | — | — | 0.2 | — | 1.4 | 0.3 | — | 2.0 | ≥99.99 |
| CEx. 17 | 0.5 | — | — | 0.2 | — | — | — | — | 1.2 | 1.9 | ≥99.99 |

Remarks: 'Ex.' means Example according to this invention.
Remarks: 'CEx.' means Comparative Example.

TABLE 2

| | First cold-rolling step [Step 6] | First annealing step [Step 7] | | | | Second cold-rolling step [Step 8] |
|---|---|---|---|---|---|---|
| | Total rolling rate (%) | Temp. increase rate (° C./sec) | End-point temp. (° C.) | Retention time (sec) | Cooling rate (° C./sec) | Total rolling rate (%) |
| Ex. 1 | 80 | 30 | 150 | 20 | 30 | 65 |
| Ex. 2 | 80 | 5 | 150 | 20 | 5 | 65 |
| Ex. 3 | 80 | 25 | 400 | 20 | 25 | 80 |
| Ex. 4 | 80 | 40 | 475 | 20 | 40 | 90 |
| Ex. 5 | 90 | 10 | 250 | 700 | 10 | 90 |
| Ex. 6 | 90 | 25 | 440 | 20 | 20 | 75 |
| Ex. 7 | 80 | 40 | 440 | 20 | 25 | 80 |
| Ex. 8 | 80 | 35 | 440 | 20 | 25 | 90 |
| Ex. 9 | 80 | 5 | 150 | 20 | 5 | 65 |
| Ex. 10 | 80 | 45 | 480 | 700 | 45 | 65 |
| Ex. 11 | 80 | 30 | 150 | 20 | 30 | 65 |
| Ex. 12 | 80 | 25 | 150 | 250 | 25 | 80 |
| Ex. 13 | 80 | 45 | 450 | 20 | 45 | 80 |

| | Second annealing step [Step 9] | | | | Finish rolling step [Step 10] |
|---|---|---|---|---|---|
| | Temp. increase rate (° C./sec) | End-point temp. (° C.) | Retention time (sec) | Cooling rate (° C./sec) | Total rolling rate (%) |
| Ex. 1 | 50 | 400 | 20 | 50 | 15 |
| Ex. 2 | 50 | 400 | 20 | 50 | 12 |
| Ex. 3 | 15 | 250 | 20 | 15 | 18 |
| Ex. 4 | 25 | 225 | 850 | 25 | 10 |

TABLE 2-continued

| | | | | | |
|---|---|---|---|---|---|
| Ex. 5 | 30 | 475 | 20 | 75 | 30 |
| Ex. 6 | 20 | 450 | 20 | 80 | 12 |
| Ex. 7 | 20 | 490 | 850 | 10 | 10 |
| Ex. 8 | 20 | 375 | 100 | 50 | 45 |
| Ex. 9 | 20 | 465 | 20 | 60 | 8 |
| Ex. 10 | 50 | 440 | 20 | 75 | 0 |
| Ex. 11 | 50 | 450 | 20 | 50 | 12 |
| Ex. 12 | 45 | 450 | 20 | 50 | 20 |
| Ex. 13 | 40 | 250 | 300 | 50 | 16 |

| | First cold-rolling step [Step 6] | First annealing step [Step 7] | | | | Second cold-rolling step [Step 8] |
|---|---|---|---|---|---|---|
| | Total rolling rate (%) | Temp. increase rate (° C./sec) | End-point temp. (° C.) | Retention time (sec) | Cooling rate (° C./sec) | Total rolling rate (%) |
| CEx. 1 | 80 | 30 | 150 | 20 | 30 | 65 |
| CEx. 2 | 90 | 25 | 400 | 20 | 25 | 65 |
| CEx. 3 | 80 | 30 | 150 | 20 | 30 | 65 |
| CEx. 4 | 95 | 25 | 400 | 20 | 25 | 75 |
| CEx. 5 | 90 | 20 | 400 | 20 | 25 | 75 |
| CEx. 6 | 90 | 45 | 600 | 500 | 45 | 75 |
| CEx. 7 | 95 | 40 | 400 | 20 | 40 | 90 |
| CEx. 8 | 80 | 5 | 150 | 20 | 5 | 80 |
| CEx. 9 | 80 | 5 | 150 | 20 | 5 | 90 |
| CEx. 10 | 80 | 10 | 80 | 100 | 10 | 65 |
| CEx. 11 | 95 | 5 | 150 | 20 | 5 | 99 |
| CEx. 12 | 80 | 45 | 725 | 20 | 45 | 75 |
| CEx. 13 | 95 | 45 | 450 | 20 | 45 | 65 |
| CEx. 14 | 80 | 110 | 350 | 20 | 110 | 65 |
| CEx. 15 | 80 | 45 | 400 | 20 | 45 | 80 |
| CEx. 16 | 80 | 45 | 475 | 4,000 | 45 | 65 |
| CEx. 17 | 60 | 5 | 150 | 20 | 5 | 65 |

| | Second annealing step [Step 9] | | | | Finish rolling step [Step 10] |
|---|---|---|---|---|---|
| | Temp. increase rate (° C./sec) | End-point temp. (° C.) | Retention time (sec) | Cooling rate (° C./sec) | Total rolling rate (%) |
| CEx. 1 | 50 | 400 | 20 | 50 | 15 |
| CEx. 2 | 25 | 450 | 20 | 50 | 12 |
| CEx. 3 | 50 | 450 | 20 | 50 | 20 |
| CEx. 4 | 50 | 450 | 20 | 50 | 12 |
| CEx. 5 | 50 | 580 | 20 | 50 | 12 |
| CEx. 6 | 50 | 450 | 20 | 50 | 15 |
| CEx. 7 | 50 | 450 | 20 | 50 | 40 |
| CEx. 8 | 50 | 200 | 200 | 50 | 12 |
| CEx. 9 | 50 | 440 | 20 | 50 | 25 |
| CEx. 10 | 50 | 440 | 20 | 50 | 12 |
| CEx. 11 | 50 | 400 | 20 | 50 | 5 |
| CEx. 12 | 50 | 440 | 20 | 50 | 12 |
| CEx. 13 | 25 | 150 | 20 | 25 | 5 |
| CEx. 14 | 50 | 440 | 20 | 50 | 12 |
| CEx. 15 | 150 | 350 | 20 | 50 | 45 |
| CEx. 16 | 50 | 485 | 4,000 | 50 | 20 |
| CEx. 17 | 50 | 450 | 20 | 50 | 12 |

TABLE 3

| | Av. orientation density in Area A | Max. orientation density in Area B | Av. grain size (μm) | Electrical conductivity (% IACS) | Tensile strength (MPa) | Av. grain size after heating (μm) |
|---|---|---|---|---|---|---|
| Ex. 1 | 22.0 | 18.0 | 30.0 | 101.0 | 254 | 115 |
| Ex. 2 | 27.0 | 14.0 | 27.0 | 100.8 | 217 | 100 |
| Ex. 3 | 8.4 | 12.0 | 40.0 | 100.9 | 275 | 142 |
| Ex. 4 | 25.0 | 9.0 | 21.0 | 100.6 | 243 | 87 |
| Ex. 5 | 19.0 | 24.0 | 43.0 | 99.8 | 295 | 113 |
| Ex. 6 | 5.9 | 17.0 | 32.0 | 100.1 | 268 | 163 |
| Ex. 7 | 7.5 | 11.0 | 81.0 | 100.0 | 221 | 154 |
| Ex. 8 | 3.5 | 26.0 | 15.0 | 98.6 | 320 | 181 |
| Ex. 9 | 34.2 | 4.8 | 38.0 | 99.9 | 195 | 70 |
| Ex. 10 | 3.2 | 14.0 | 45.0 | 100.2 | 190 | 125 |
| Ex. 11 | 23.4 | 16.5 | 32.0 | 99.4 | 259 | 119 |

TABLE 3-continued

| | Av. orientation density in Area A | Max. orientation density in Area B | Av. grain size (μm) | Electrical conductivity (% IACS) | Tensile strength (MPa) | Av. grain size after heating (μm) |
|---|---|---|---|---|---|---|
| Ex. 12 | 26.9 | 19.7 | 28.8 | 96.2 | 261 | 110 |
| Ex. 13 | 8.6 | 22.5 | 22.4 | 95.8 | 284 | 145 |
| CEx. 1 | 2.7 | 27.0 | 29.5 | 100.9 | 276 | 359 |
| CEx. 2 | 1.0 | 26.5 | 30.1 | 100.0 | 268 | 403 |
| CEx. 3 | 2.3 | 31.0 | 32.0 | 100.8 | 298 | 368 |
| CEx. 4 | 1.2 | 25.0 | 29.0 | 100.4 | 270 | 375 |
| CEx. 5 | 0.8 | 35.0 | 120.0 | 100.5 | 200 | 456 |
| CEx. 6 | 1.7 | 24.0 | 34.0 | 100.9 | 265 | 401 |
| CEx. 7 | 0.1 | 37.0 | 29.0 | 100.2 | 312 | 399 |
| CEx. 8 | 1.3 | 19.0 | 27.1 | 100.0 | 265 | 411 |
| CEx. 9 | 4.1 | 31.0 | 25.0 | 93.4 | 295 | 400 |
| CEx. 10 | 1.9 | 18.0 | 27.0 | 100.3 | 278 | 402 |
| CEx. 11 | 42.5 | 5.9 | 31.2 | 100.8 | 145 | 275 |
| CEx. 12 | 2.5 | 19.0 | 33.0 | 100.1 | 280 | 420 |
| CEx. 13 | 11.1 | 39.0 | 19.3 | 99.5 | 385 | 435 |
| CEx. 14 | 2.9 | 22.0 | 27.4 | 100.3 | 274 | 400 |
| CEx. 15 | 3.5 | 31.0 | 23.4 | 100.1 | 318 | 380 |
| CEx. 16 | 2.7 | 32.0 | 26.7 | 100.8 | 283 | 432 |
| CEx. 17 | 2.9 | 24.0 | 31.0 | 100.9 | 270 | 399 |

Table 1 and Table 3 have demonstrated that each copper alloy conductor in Examples 1 to 13 had a composition where the total content of metal components selected from Al, Be, Cd, Mg, Pb, Ni, P, Sn, and Cr was from 0.1 to 2.0 ppm, and the content of copper was 99.96 mass % or higher. In addition, each copper alloy conductor in these Examples had a texture where when a crystal orientation distribution function obtained from texture analysis by EBSD was expressed using Euler angles (φ1, Φ, and φ2), the average orientation density in an area where φ2=0 degrees, φ1=0 degrees, and Φ=from 0 degrees to 90 degrees was from 3.0 to less than 35.0, and the maximum orientation density in an area where φ2=35 degrees, φ1=from 45 degrees to 55 degrees, and Φ=from 65 degrees to 80 degrees was from 1.0 to less than 30.0. Consequently, each copper alloy conductor had a tensile strength of from 150 to 330 MPa; and the electrical conductivity was 95% IACS or more, and was high; and the average grain size after heat treatment at 800° C. for 5 h was 200 μm or less. As a result, growth of grains was suppressed.

In each copper alloy conductor in Examples 1 to 13, the electrical conductivity was 95% IACS or more and was high, and growth of grains was suppressed even after exposure to a high-temperature range. Thus, each insulated wire having resin layers, including a foamed insulating layer, or each insulated wire having resin layers, including an enamel insulating layer and an extruded insulating layer, on the outer peripheral face of each copper alloy conductor, can be determined to be an insulated wire having favorable electrical conductivity and excellent heat resistance of the whole insulated wire.

By contrast, in Comparative Examples 1, 2, 4, 6, and 8, the total content of metal components selected from Al, Be, Cd, Mg, Pb, Ni, P, Sn, and Cr exceeded 2.0 ppm; and the average orientation density in an area where φ2=0 degrees, φ1=0 degrees, and Φ=from 0 degrees to 90 degrees was less than 3.0. As a result, the average grain size after heat treatment at 800° C. for 5 h exceeded 200 μm and growth of grains were observed.

In Comparative Example 3 or 7, the total content of metal components selected from Al, Be, Cd, Mg, Pb, Ni, P, Sn, and Cr was 150.0 ppm or 130.0 ppm, respectively, and was large; the average orientation density in an area where φ2=0 degrees, φ1=0 degrees, and Φ=from 0 degrees to 90 degrees was 2.3 or 0.1, respectively, and was low; and the maximum orientation density in an area where φ2=35 degrees, φ1=from 45 degrees to 55 degrees, and Φ=from 65 degrees to 80 degrees was 31.0 or 37.0, respectively, and was high. As a result, the average grain size after heat treatment at 800° C. for 5 h was 368 μm and 399 μm, respectively, and was large; and growth of grains were observed.

In Comparative Example 5, the total content of metal components selected from Al, Be, Cd, Mg, Pb, Ni, P, Sn, and Cr was 250.0 ppm, and was large; the average orientation density in an area where φ2=0 degrees, φ1=0 degrees, and Φ=from 0 degrees to 90 degrees was 0.8, and was low; and the maximum orientation density in an area where φ2=35 degrees, φ1=from 45 degrees to 55 degrees, and Φ=from 65 degrees to 80 degrees was 35.0, and was high. As a result, the average grain size after heat treatment at 800° C. for 5 h was 456 μm and was large; and growth of grains were observed.

In Comparative Example 9, the content of copper was 99.00 ppm; and the maximum orientation density in an area where φ2=35 degrees, φ1=from 45 degrees to 55 degrees, and Φ=from 65 degrees to 80 degrees was 31.0, and was high. Consequently, the electrical conductivity of Comparative Example 9 was 93.4% IACS and was low. Further, the average grain size after heat treatment at 800° C. for 5 h was 400 μm and was large. Then, growth of grains was observed.

In Comparative Example 10, 12, 14, or 17, the average orientation density in an area where φ2=0 degrees, φ1=0 degrees, and Φ=from 0 degrees to 90 degrees was 1.9, 2.5, 2.9, or 2.9, respectively, and was low. As a result, the average grain size after heat treatment at 800° C. for 5 h was 402 μm, 420 μm, 400 μm, or 399 μm, respectively, and was large; and growth of grains were observed.

In Comparative Example 11, the average orientation density in an area where φ2=0 degrees, φ1=0 degrees, and Φ=from 0 degrees to 90 degrees was 42.5, and was high. Consequently, the copper alloy conductor in Comparative Example 11 had a tensile strength of 145 MPa and was low. As a result, the average grain size after heat treatment at 800° C. for 5 h was 275 μm and was large; and growth of grains were observed.

In Comparative Example 13, the maximum orientation density in an area where φ2=35 degrees, φ1=from 45 degrees to 55 degrees, and Φ=from 65 degrees to 80 degrees was 39.0, and was high. Consequently, the copper alloy conductor in Comparative Example 13 had a tensile strength of 385 MPa and was high. As a result, the average grain size after heat treatment at 800° C. for 5 h was 435 μm and was large; and growth of grains were observed.

In Comparative Example 15, the maximum orientation density in an area where φ2=35 degrees, φ1=from 45 degrees to 55 degrees, and Φ=from 65 degrees to 80 degrees was 31.0, and was high. As a result, the average grain size after heat treatment at 800° C. for 5 h was 380 μm, and was large; and growth of grains were observed.

In Comparative Example 16, the average orientation density in an area where φ2=0 degrees, φ1=0 degrees, and Φ=from 0 degrees to 90 degrees was 2.7, and was low, and the maximum orientation density in an area where φ2=35 degrees, φ1=from 45 degrees to 55 degrees, and Φ=from 65 degrees to 80 degrees was 32.0, and was high. As a result, the average grain size after heat treatment at 800° C. for 5 h was 432 μm, and was large; and growth of grains were observed.

Thus, in each copper alloy conductor in Comparative Examples 1 to 17, growth of grains even after exposure to a high-temperature range was not suppressed. Due to this, each insulated wire having the same resin layers including a foamed insulating layer as in Examples 1 to 13 or each insulated wire having the same resin layers including an enamel insulating layer and an extruded insulating layer as in Examples 1 to 13 on the outer peripheral face of each copper alloy conductor, could be determined to have poorer heat resistance than any insulated wire using each copper alloy conductor in Examples 1 to 13.

Collectively, any insulated wire according to the present invention, using, as a conductor, each copper alloy conductor having the specific composition and texture as described in Examples 1 to 13 can be determined to exhibit excellent heat resistance of the whole insulated wire than any insulated wire using each copper alloy conductor that did not have such a specific composition and texture and was described in Comparative Examples 1 to 17. In conclusion, any insulated wire according to the present invention is found to be useful in imparting higher performance to, for example, coils of motor generators that require, in particular, miniaturization and high output and are carried in EV vehicles and so on.

REFERENCE SIGNS LIST

1 Copper alloy conductor
2 Foamed insulating layer
3 Outer insulating layer
4 Resin layer
**4*a*** Enamel insulating layer
**4*b*** Extruded insulating layer
10 Insulated wire

The invention claimed is:

1. An insulated wire including:

a copper alloy conductor; and at least one resin layer directly or indirectly coated on an outer peripheral face of the copper alloy conductor, wherein the copper alloy conductor has a composition where a total content of metal components selected from Al, Be, Cd, Mg, Pb, Ni, P, Sn, and Cr is from 0.1 to 2.0 ppm and content of copper is 99.96 mass % or higher, and has a texture where when a crystal orientation distribution function obtained from texture analysis by EBSD is expressed using Euler angles (φ1, Φ, and φ2), an average orientation density in an area where φ2=0 degrees, φ1=0 degrees, and Φ=from 0 degrees to 90 degrees is from 3.0 to less than 35.0, and a maximum orientation density in an area where φ2=35 degrees, φ1=from 45 degrees to 55 degrees, and Φ=from 65 degrees to 80 degrees is from 1.0 to less than 30.0.

2. The insulated wire according to claim 1, wherein an average grain size of the copper alloy conductor is 1 μm to 100 μm.

3. The insulated wire according to claim 1, wherein the at least one resin layer includes a foamed insulating layer containing a foamed thermosetting resin.

4. The insulated wire according to claim 3, wherein an outer insulating layer containing a thermoplastic resin is further formed, on an outer peripheral face of the foamed insulating layer.

5. The insulated wire according to claim 3, wherein the thermosetting resin is selected from the group consisting of polyamideimide, polyimide, polyamide, polyetherimide, polyesterimide, and polyethersulfone.

6. The insulated wire according to claim 1, wherein the at least one resin layer includes: at least one enamel insulating layer; and an extruded insulating layer that is coated on the outer peripheral face of the enamel insulating layer and that contains a thermoplastic resin.

7. The insulated wire according to claim 4, wherein the thermoplastic resin is selected from the group consisting of polyetheretherketone, a modified polyetheretherketone, polyetherketoneketone, polyetherketone, polyetherketoneetherketoneketone, polyphenylene sulfide, and a thermoplastic polyimide.

* * * * *